Aug. 30, 1927.
C. A. SVENSSON
1,640,626
BOGIE FOR RAILWAY CARS AND THE LIKE
Filed April 26, 1927
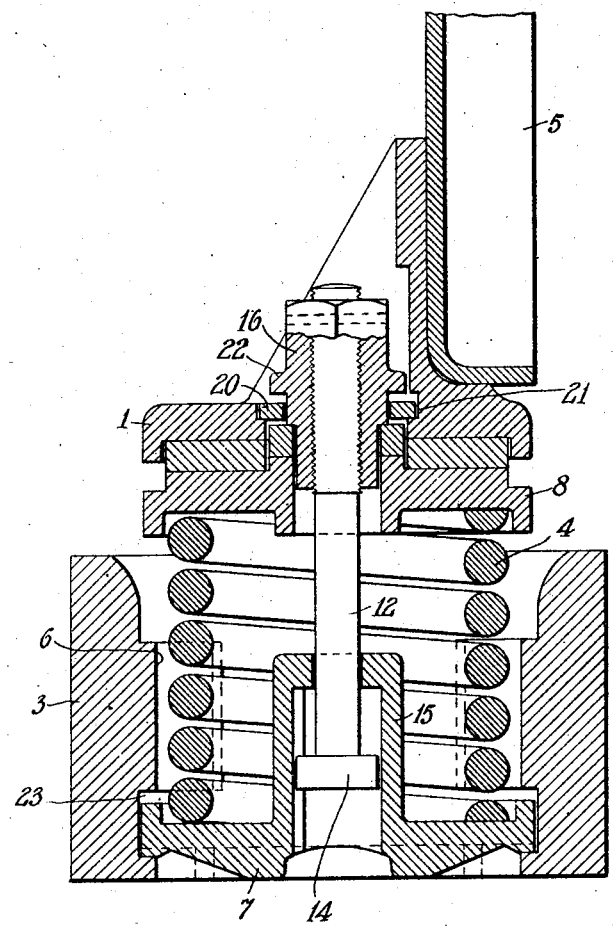
Inventor
Carl Alfred Svensson
By his Attorney Patented Aug. 30, 1927.

1,640,626

UNITED STATES PATENT OFFICE.

CARL ALFRED SVENSSON, OF FALUN, SWEDEN.

BOGIE FOR RAILWAY CARS AND THE LIKE.

Application filed April 26, 1927, Serial No. 186,665, and in Sweden May 3, 1926.

In bogies for railway cars and like vehicles having side beams, especially beams placed in members suspended from and under the axle journal, it is of importance, for the sake of traffic safety, to prevent beams, spring washers and springs etc. from falling down onto the track, in case any of the abovementioned suspension details should break.

This invention relates to safety devices provided for such purpose. Its principal features are that a nut provided with a flange and screwed on to the bolt bears on a safety washer preferably placed in a recess in the spring fastening and that the edge of the bottom washer carrying the spring fits in a recess in the spring beam, whereby the bolt, in case of rupture of the spring beam, can carry the members suspended below.

In the drawing, I have shown a section of the spring beam through the opening receiving the spring.

Referring to the drawing, the device shown is similar to that described in my co-pending patent application, Serial Number 122,748, filed July 16, 1926, but it differs from the same principally in that the spring holder 1 carries a washer 20 suitably placed in a recess 21 in the said spring holder. This washer serves to prevent accidents in case the spring beam 3 should happen to break, since in such case the washer will support the nut 16 having a flange 22. Moreover, the bottom washer 7 supporting the spring 4 fits with its edge in an inner recess 23 in the spring beam. The result will be an efficient safety device preventing the parts from falling down on the track.

The mounting and manner of operation of the device are as follows: After the spring 4 has been compressed and placed in position on the spring beam, the nut 16 is unscrewed and the safety washer 20 placed in position in the recess 21 of the spring holder 1. The safety washer cannot be placed on the bolt 12 by compression of the spring, because then it would not be possible to introduce the spring from below through the spring holder.

In case of failure of the spring beam, this has a possibility of falling down a short distance corresponding to the play which, for the normal spring action, exists between the bolt head 14 and the bottom of the lower spring washer 7. In such case this spring washer will come to bear against the upper bearing surface of the recess 23 in the spring beam, and the flange 22 of the nut 16 will bear against the safety washer 20. The bolt 12 will then be loaded and carries the parts suspended below it.

I claim:

In bogies for railway cars and the like, the combination of a spring, a spring holder, a washer placed in a recess in the said spring holder, a bolt serving to compress the said spring, a nut screwed on to the said bolt, said nut having a flange bearing on the said washer, and a bottom washer supporting the spring and fitting with its edge in the beam, substantially as and for the purpose set forth.

In testimony whereof I have signed my name.

CARL ALFRED SVENSSON.